United States Patent
Heidrich (10) Patent No.: US 6,885,163 B2
(45) Date of Patent: Apr. 26, 2005

(54) METHOD FOR STARTING A BRUSHLESS D.C. MOTOR

(75) Inventor: Torsten Heidrich, Vaihingen/Enz (DE)

(73) Assignee: Robert Bosch GmbH (DE)

( * ) Notice: Subject to any disclaimer, the term of this patent is extended or adjusted under 35 U.S.C. 154(b) by 0 days.

(21) Appl. No.: 10/472,750

(22) PCT Filed: Dec. 16, 2002

(86) PCT No.: PCT/DE02/04582
§ 371 (c)(1),
(2), (4) Date: Sep. 24, 2003

(87) PCT Pub. No.: WO03/052919
PCT Pub. Date: Jun. 26, 2003

(65) Prior Publication Data
US 2004/0113576 A1 Jun. 17, 2004

(30) Foreign Application Priority Data
Dec. 19, 2001 (DE) .......................................... 101 62 380

(51) Int. Cl.$^7$ ................................................ H02P 1/18
(52) U.S. Cl. ........................ 318/254; 318/138; 318/439; 318/720; 388/928.1
(58) Field of Search ................................ 318/254, 439, 318/138, 430, 431, 459, 500, 700, 720, 721, 722, 724; 388/928.1

(56) References Cited
U.S. PATENT DOCUMENTS

| 4,876,491 | A | | 10/1989 | Squires et al. |
| 5,028,852 | A | * | 7/1991 | Dunfield .................... 318/254 |
| 5,117,165 | A | | 5/1992 | Cassat et al. |
| 5,254,914 | A | | 10/1993 | Dunfield et al. |
| 5,497,064 | A | * | 3/1996 | Van Sistine ................. 318/701 |
| 5,569,990 | A | * | 10/1996 | Dunfield ..................... 318/254 |
| 5,841,252 | A | * | 11/1998 | Dunfield .................... 3118/254 |
| 6,204,617 | B1 | * | 3/2001 | Van Hout et al. ........... 318/254 |
| 6,441,572 | B1 | * | 8/2002 | Batzel ....................... 318/254 |
| 6,541,936 | B1 | * | 4/2003 | Viti .......................... 318/727 |

FOREIGN PATENT DOCUMENTS

| DE | 3709168 A1 | * | 9/1988 |
| DE | 4040926 C1 | * | 4/1992 |

* cited by examiner

Primary Examiner—Rina Duda
(74) Attorney, Agent, or Firm—Michael Best & Friedrich LLP (57) ABSTRACT

A process to start a brushless direct current motor with a multiphase stator winding is disclosed, in which, during rotor standstill, a plurality of current impulses is intruded on the stator winding, the current rise time until a current threshold is reached is measured in the stator winding with every current impulse and the rotor position is derived from the measured current rise times. A more precise determination of rotor position is achieved with lower control-related effort for a regulated sensorless start-up in that a plurality of test current impulses is successively intruded on the stator winding in such a way that the test current impulses generate stator flow vectors offset by the same angular increments over 360° electrically in the stator. The current rise time for each stator flow vector is measured in the total current of the stator winding and the phase position of the stator flow vector with the smallest current rise time is determined as the rotor position.

10 Claims, 4 Drawing Sheets

FIG. 1

| $I_n$ | Brückenschaltung 0 = aus 1 = ein | | | | | | Phasen-lage $\alpha_n$ SFV | Wicklungsphase | | |
|---|---|---|---|---|---|---|---|---|---|---|
| | T1 | T2 | T3 | T4 | T5 | T6 | | 121 | 122 | 123 |
| 1 | 1 | 0 | 0 | 1 | 0 | 1 | 0° | + | − | − |
|   | 1 | 0 | 0 | 0 | 0 | 1 | 30° | + |   | − |
| 2 | 1 | 0 | 1 | 0 | 0 | 1 | 60° | + | + | − |
|   | 0 | 0 | 1 | 0 | 0 | 1 | 90° |   | + | − |
| 3 | 0 | 1 | 1 | 0 | 0 | 1 | 120° | − | + | − |
|   | 0 | 1 | 1 | 0 | 0 | 0 | 150° | − | + |   |
| 4 | 0 | 1 | 1 | 0 | 1 | 0 | 180° | − | + | + |
|   | 0 | 1 | 0 | 0 | 1 | 0 | 210° | − |   | + |
| 5 | 0 | 1 | 0 | 1 | 1 | 0 | 240° | − | − | + |
|   | 0 | 0 | 0 | 1 | 1 | 0 | 270° |   | − | + |
| 6 | 1 | 0 | 0 | 1 | 1 | 0 | 300° | + | − | + |
|   | 1 | 0 | 0 | 1 | 0 | 0 | 330° | + | − |   |

METHOD FOR STARTING A BRUSHLESS D.C. MOTOR

STATE OF THE ART

The invention relates to a process to start a brushless direct current motor.

Brushless direct current motors, so-called BLDC motors, are electronically commutated, whereby the switching device's semiconductor switches that are arranged in the bridge circuit are switched through (closed) or blocked (open) according to a prescribed commutation pattern for logically energizing the individual winding strands or winding phases of the stator winding by a control device as a function of the rotational position of the rotor. The commutation guarantees that the angular relation of 90° is electrically maintained between a stator flow vector generated by the stator winding and the rotor's magnetomotive force vector, and thus the rotor is driven by the revolving stator field or stator flow vector.

Position sensors are used in order to determine the rotor position (DE 40 40 926 C1). BLDC motors are known in which rotor-induced voltages are evaluated in order to determine the rotor position (DE 37 09 168 A1). Disadvantageous in this is that no voltage is induced in a motor standstill, the rotor position is not known as a result and therefore motor start-up turns out to be difficult particularly in the case of extremely variable or high loads.

Known from U.S. Pat. No. 5,569,990 and/or U.S. Pat. No. 5,028,852 is determining the rotor position of a BLDC motor at a standstill with a precision of 180°/m electrically, whereby m is the phase number of the stator winding, so that this knowledge of the rotor position can be used to start the motor by applying a commutation pattern of the triggering signals adjusted to the rotor's rotational position for the switching device in the correct direction of rotation. To do so, current impulses are applied to the stator winding of the stationary motor, which are long enough, on the one hand, to permit a correct measurement and are short enough, on the other, that the rotor does not rotate, i.e., retains its position. To this end, a positive or negative test current impulse is given at every winding phase or every winding strand of the stator winding, the current rise time, i.e., the time that passes until the current flowing in the winding phase reaches a current threshold, is measured and the time different between the two current rise times is determined. The time vector composed of the current rise times is read into an energizing table for the stator winding, which contains the energizing pattern of the m winding phases required for commutation in order to allow the rotor to rotate in the desired direction of rotation. The combination of phase energizing associated with the time vector is realized by corresponding triggering signals, which are applied to the control inputs of the switching device's semiconductor switch. The triggering signals are then varied in the manner prescribed by the commutation pattern so that an appropriate torque is exerted on the rotor and the rotor revs up to a maximum speed.

SUMMARY OF THE INVENTION

Advantages of the Invention

The process in accordance with the invention has the advantage of the more precise determination of the rotor position at motor standstill with lower control-related effort. The available signal deviation is utilized better so that the test currents in the winding phases or winding strands can be made smaller or shorter, which makes a higher driving torque possible due to the greater energizing times for generating torque that are thereby possible. If the rotor position has been determined then, in accordance with additional embodiments of the process according to the invention, the possible driving torque can be further increased with a lower number of additional test current impulses in the case of both an active as well as passive load.

Advantageous further developments and improvements of the process.

If the rotor position has been determined, then, in accordance with a preferred embodiment of the process according to the invention, a current impulse is intruded on the stator winding, which generates a torque-forming stator flow vector, whose phase position is offset by 90° electrically in the rotor's direction of rotation selected as the direction of force vis-à-vis the determined rotor position. After a time span, which is selected as constant or as a function of the motor's speed of rotation, a lower number of additional test current impulses are intruded on the stator winding to check the rotor position. If the rotor position is unchanged, the torque-forming stator flow vector is generated again by intruding a current impulse. If the rotor has rotated, a current impulse is used to generate a torque-forming stator flow vector, whose phase position is again offset by 90° electrically vis-à-vis the newly determined rotor position. This process is continued until the rotor's speed of rotation is recognized as sufficient, after which a change is made to another known process for sensorless determination of the rotor position. As a result, the cyclically occurring test current impulses are eliminated and the motor can be utilized to the full scope of its power.

The intrusion of additional test current impulses can be conducted in various ways. If the motor's direction of rotation is known, then, in accordance with a preferred embodiment of the invention, the test current impulses are intruded in such a way that a first additional test current impulse generates a first stator flow vector, whose phase position coincides with the determined rotor position, and a second additional test current impulse generates a second stator flow vector, whose phase position is offset vis-à-vis the first stator flow vector by an electrical angular increment in the direction of force. The direction of force in this regard is the rotor's known direction or rotation. The current rise times associated with the two stator flow vectors are measured and compared to one another, and the phase position of the stator flow vector with the smallest current rise time is determined as the new rotor position. Afterwards a current impulse is again intruded on the stator winding, which generates a torque-forming stator flow vector, whose phase position is offset by 90° electrically vis-à-vis the new rotor position in the direction of force.

If the motor's direction of rotation is unknown, then, in accordance with an advantageous embodiment of the invention, the additional test current impulses are intruded in such a way that a first additional test current generates a first stator flow vector, which is offset vis-à-vis the phase position of the previously generated torque-forming stator flow vector by 90° electrically plus an electrical angular increment against the direction of force, and a second additional and third additional test current impulse each generate a second and third stator flow vector, each of which is offset vis-à-vis the first or second stator flow vector by an electrical angular increment in the direction of force. The current rise times associated with the stator flow vectors are again measured and compared to one another, and the phase position of the stator flow vector with the smallest current rise time is determined as the new rotor position. Finally, a current impulse is intruded on the stator winding, which generates a torque-forming stator flow vector, whose phase position is offset by 90° electrically vis-à-vis the new rotor position in the direction of force.

In both cases, the determination of the sequence of applying the additional test current impulses described in the foregoing has the following advantages: Before a test current impulse is applied, it is necessary that the phase currents generated in the winding phases by the previous test current impulses have decayed. This guarantees that the measuring results obtained with the individual test current impulses are not distorted by an already existing phase current. After the last test current impulse has been intruded and therefore the current rotor position is known, the current impulse to generate the torque-forming stator flow vector can be intruded directly. The decaying of the phase currents in the stator winding is no longer necessary in this case. Due to the determination of the sequence of the test current impulses described in the foregoing, the stator flow vector generated by the last test current impulse always lies 30° electrically (when the rotor position was confirmed) and 90° electrically (when a new rotor position has been recognized) next to the stator flow vector, which is required for the subsequent generation of torque to further to move the rotor. If the stator flow vector generated by the last test current impulse is only 30° electrically next to the torque-forming stator flow vector, then to generate the torque-forming stator flow vector, only one of the winding phases of the stator winding energized by the last test current impulse does not need to be energized anymore. If the distance between the stator flow vectors is 90° electrically, to generate the torque-forming stator flow vector, at least one of the winding phases energized by the last test current impulse can remain equally energized for the generation of the torque-forming stator flow vector. Because of integrating the last test current impulse with the current impulse for the generation of the torque, a clear increase in torque is achieved in start-up since the relationship of the times for the test current impulses and the times for the generation of the torque is improved without the time for the generation of the torque having been lengthened.

In accordance with an advantageous embodiment of the invention, in order to determine the stator flow vector that determines the rotor position, the phase positions and the associated current rise times of consecutive stator flow vectors are saved and, in the process, the saved values of the previous stator flow vector are overwritten by those of the successive stator flow vector, if the current rise time associated with the successive stator flow vector is smaller than the current rise time associated with the previous stator flow vector. As a result of this variation of the process, not all current rise times and associated phase positions of the stator flow vector have to be saved. It suffices if the current rise times and the phase positions of the generated stator flow vectors are each saved for two directly consecutive test current impulses so that the memory space requirements are limited to only two memories. In this connection, the present current rise time and the present phase position of the stator flow vector just generated are always written to the first memory and a comparison logic functioning in the manner described above makes sure that the phase position of the stator flow vector whose associated current rise time is the smallest is always saved in the second memory.

DRAWINGS

The invention is described in more detail in the following on the basis of an exemplary embodiment depicted in the drawing. It shows.

DESCRIPTION OF THE EXEMPLARY EMBODIMENT

Figure 1:
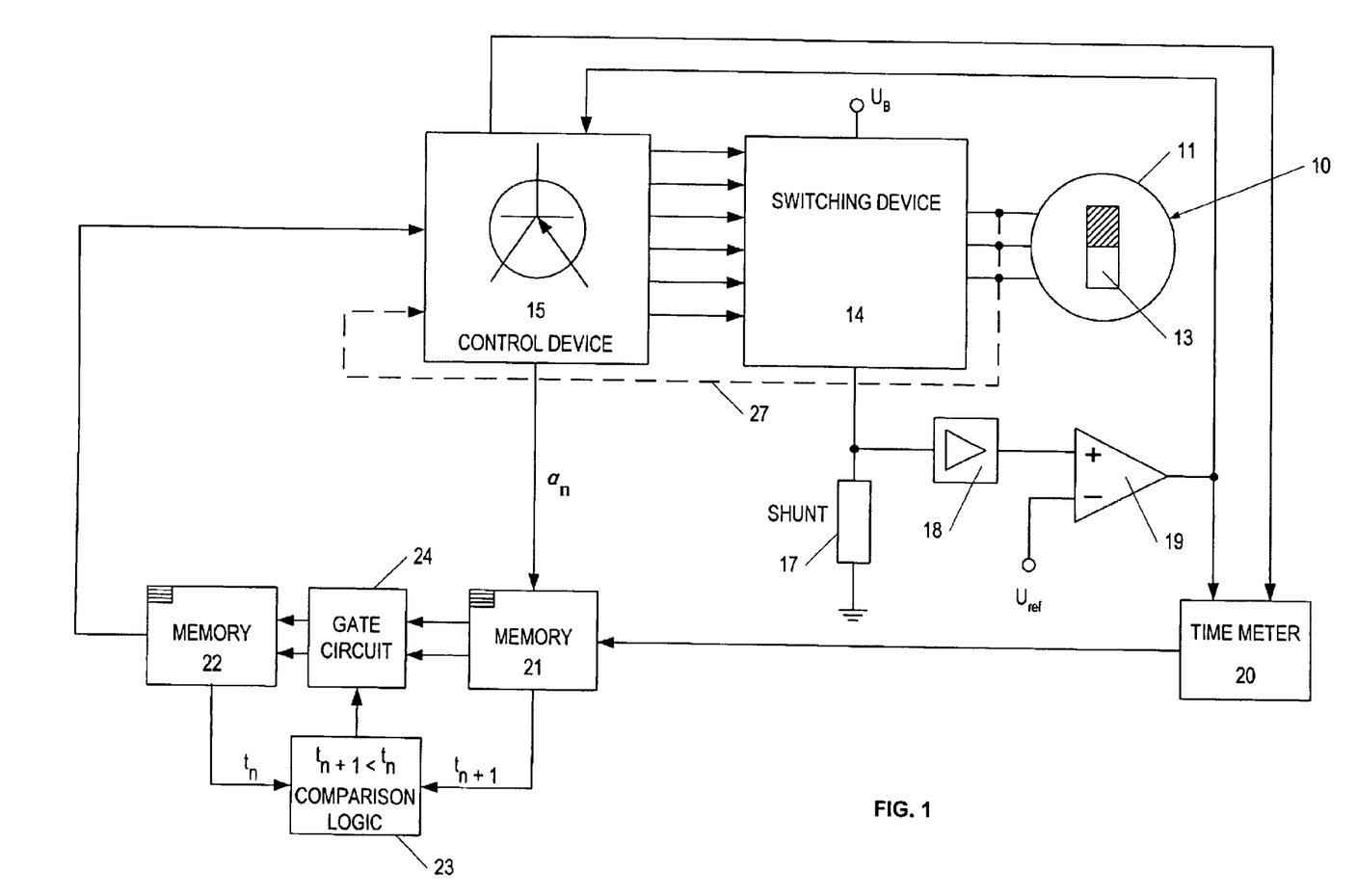
FIG. 1 A block diagram of a device to operate a brushless direct current motor on a direct current voltage network.
Figure 2:
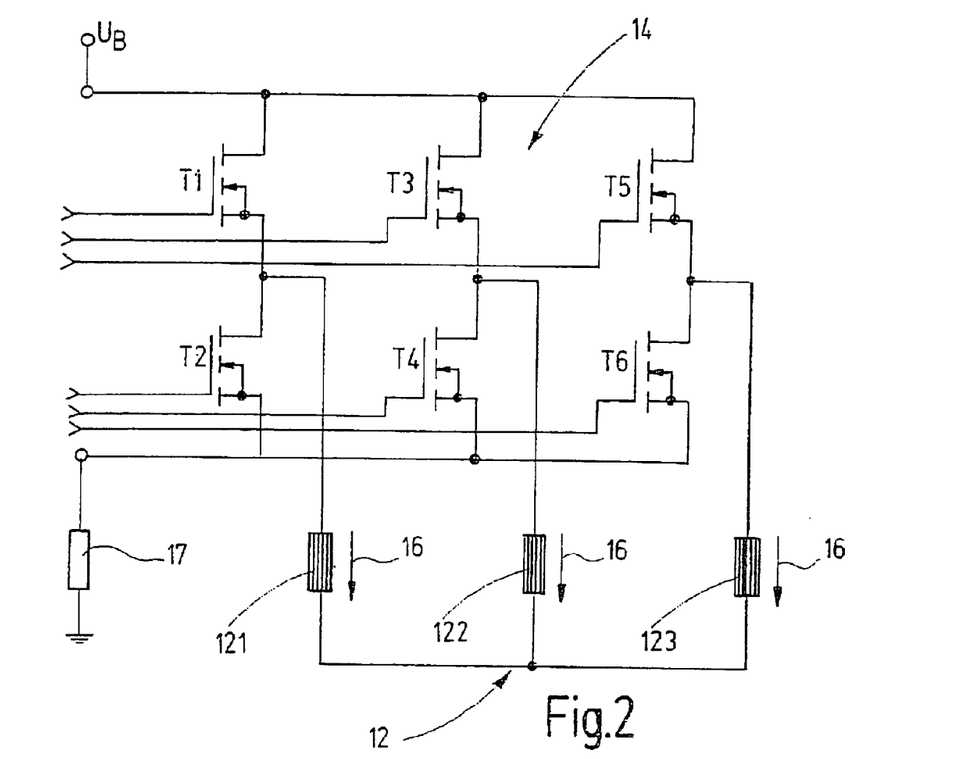
FIG. 2 A circuit diagram of the switching device in the device according to FIG. 1.

FIG. 1 depicts a block diagram of a device to operate a brushless direct current motor 10 on a direct current voltage network with mains direct current $U_B$. The direct current motor 10 features in a known manner a stator 11 with a three-phase stator winding 12 in the exemplary embodiment (FIG. 2) and a rotor 13 excited by a permanent magnet. Alternatively, the rotor can also be excited by direct current. The three winding phases or winding strands 121, 122, 123 of the three-phase stator winding 12 are logically so energized by means of a switching device 14, which is controlled by a control device 15, so that a stator field revolves in the stator, which leads the rotor's 13 magnetomotive force by 90° electrically in the direction of rotation. In this process, it is necessary to monitor the rotational position of the rotor 13 and to correspondingly trigger the switching device 14. The momentary rotational position of the rotor is determined with the aid of rotor-induced voltage in the winding phases 121–123 of the stator winding 12, which is indicated in FIG. 1 by the voltage measuring line 27 shown as a broken line.

The switching device 14 comprises a plurality of semiconductor switches, which are embodied in the exemplary embodiment as MOSFETs and are combined in a two-way bridge circuit. In the case of the selected three-phase winding, there are six semiconductor switches T1–T6 in the switching device 14, whose control inputs are attached to the control device 15. Triggering signals are generated in the control device 15 in accordance with a prescribed commutation pattern (left part of table in FIG. 3), which are applied to the individual semiconductor switches T1–T6 and thereby effect an energizing of the winding phases 121–123 of the stator winding 12, as depicted in the right part of the table in FIG. 3. In this case, the plus sign signifies a positive energizing in the direction of arrow 16 in FIG. 2 and a minus sign signifies a reverse energizing. An empty box stands for a currentless winding phase. If, for example, the semiconductor switches T1, T4 and T6 are triggered, then these switch through, and current flows in the direction of arrow 16 in the winding phase 121 and against the direction of the arrow in the winding phases 122 and 123.

When the motor is at a standstill there is the problem that at zero speed of rotation, no voltage is induced in the stator winding 12 so that the sensorless process to determine rotor position by evaluating the strand or phase voltages of the motor 10 cannot be used. In order to guarantee a regulated motor start, additional components are provided for a regulated sensorless start-up. These include an instrument shunt 17 through which the total current of the stator winding 12 flows, an amplifier 18, a comparator 19, to whose one input a reference voltage $U_{ref}$ is applied, a time meter 20, two memories 21, 22, a comparison logic 23 to compare the memory contents of the two memories 21, 22 and a gate circuit 24 controlled by the comparison logic 23, which allows the memories values from memory 21 to be written to memory 22 when the gate is opened.

The following process to start a brushless direct current motor 10 is conducted with these components for the regulated start-up of the motor 10:

When the rotor 13 is at a standstill, six test current impulses are intruded on the three-phase stator winding 12, which generate stator flow vector in the stator, which are offset from one another by 60° electrically. To do this, the semiconductor switches T1–T6 of the switching device 14 are successively triggered with the switching signals indicated in the left part of the table in accordance with FIG. 3. The ordinal number of the impulses $I_n$ with n=1, 2, 3, 4, 5, 6 is entered in the left column of FIG. 3. The required triggering signals of the semiconductor switches T1–T6 are depicted in the left part of the table. A "1" here means a closed semiconductor switch, i.e., a switched through MOSFET, a "0" stands for a blocked MOSFET, i.e., an open semiconductor switch T1–T6. The test current impulses in this are of such a short duration that the torques generated in the motor are so small that the rotor 13 does not move due to its moment of inertia and friction. With every test current impulse $I_n$, the winding phases 121, 122, 123 of the stator winding 12 are energized in the manner indicated in the right part of the table in FIG. 3, whereby a stator flow vector is generated in the stator whose phase position α is entered in the center column of the table in FIG. 3. With the first test current impulse $I_1$, the semiconductor switches T1, T4 and T6 for example are triggered as recorded in FIG. 3. A phase current that is increasing time-wise flows in the winding phase 121 in the direction of arrow 16, which flows via the winding phases 122, 123 against arrow 16 and via the instrument shunt 17. The total current flowing via the instrument shunt 17 produces a measuring voltage, which is fed via the amplifier 18 to the comparator 19. If the voltage tapped and amplified on the instrument shunt 17 exceeds the reference voltage $U_{ref}$ the comparator 16 generates an output signal, which reaches the time meter 20 and the control device 15 as a stop signal. When the control device 15 initiates each test current impulse, the control device 15 also starts the time meter 20, which measures the time until the total current generated by the test current impulse in the winding phases 121–123 has reached the current threshold stipulated by the reference voltage $U_{ref}$. If this is the case, the time measurement is terminated by the comparator's 19 output signal and the triggering of the semiconductor switches is terminated via the control device 15. The time $t_1$, measured by the time meter 20 is saved together with the phase position $α_1$ of the stator flow vector generated by the test current impulse $I_1$. The same process is repeated when the second test current impulse $I_2$ is intruded by triggering the semiconductor switches $T_1$, $T_3$, $T_6$ and when intruding the remaining test current impulses $I_3$ through $I_6$.

Figure 4:
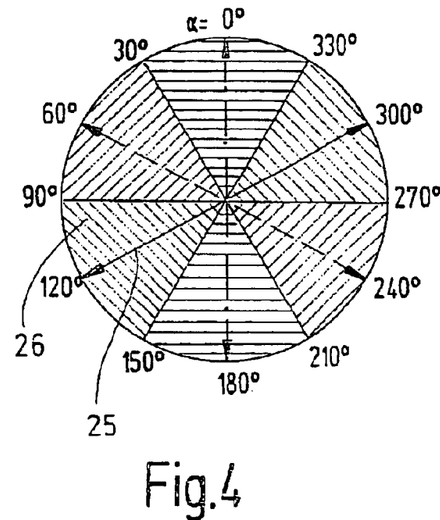
FIG. 4 to 10 Representations of the stator flow vectors generated in the stator to explain the process to start a brushless direct current motor.

After intruding all test current impulses In with n=1–6, the six stator flow vectors 25 depicted in FIG. 4 are generated successively, and the current rise time $t_n$ and the phase position $α_n$ are saved for each stator flow vector 25. Then the current rise times are compared to one another, and the phase position of the stator flow vector associated with the smallest current rise time is determined as the rotor position. This rotor position defines a sector 26 of 60° electrically, whose axis of symmetry is determined by the phase position $α_n$ of the stator flow vector 25. FIG. 4 depicts the six stator flow vectors 25 and the associated sectors 26. In the case of an m-phase stator winding with m>2, a total of 2 m test current impulses generate 2 m stator flow vectors 25, which are offset from one another by 180°/m electrically and define 2 m sectors 26 with an angle width of 180°/m electrically.

So that is not necessary to save all current rise times $t_n$ and the associated phase positions $α_n$ with n=1–6 of the stator flow vectors and to be able to reduce memory requirements to the two memories 21, 22, the current time $t_n$ measured by the time meter 20 is always written to the memory 21 and allocated there to the phase position $α_n$ of the current stator flow vector. After the first test current impulse $I_1$ the current rise time $t_1$ saved in the first memory 21 and the associated phase position $α_1$ of the stator flow vector generated by the test impulse $I_1$ are written to the second memory 22. When the second test current impulse $I_2$ is applied, the current rise time $t_2$ is measured in the total current of the stator winding 12 and it is written to the memory 21 along with the associated phase position $α_2$ of the stator flow vector 25. The comparison logic 23 now compares the current rise time $t_1$ contained in the second memory 22 with the current rise time $t_2$ written to the first memory 21. If the current rise time $t_2$ is less than the current rise time $t_1$, the comparison logic 23 opens the gate circuit 24, and the memory contents of the second memory 22 are overwritten by the memory contents of the first memory 21. If the current rise time $t_2$ is greater than the current rise time $t_1$, the gate circuit 24 remains closed, and with the next test current impulse $I_3$, the memory contents of the memory 21 are overwritten by the current rise time $t_3$ and the phase position $α_3$ of the stator flow vector generated by the third test current impulse $I_3$. The comparison logic 23 again compares the current rise times $t_{n+1}$ and $t_n$ saved in the two memories 21, 22 and either opens or does not open the gate circuit 24 as described above. If all six test current impulses $I_n$ have been applied to the stator winding 12, then the smallest current rise time and the phase position of the associated stator flow vector have been saved in the second memory 22. This phase position determines the sector 26 in which the maximum interlinking between the rotor flow and the stator flow occurs, thereby defining the sector 26 in which the rotor 13 is momentarily located. It must be noted that the time span between the consecutive test current impulses is selected so that the phase currents generated by a test current impulse have decayed in the stator winding 12 before the next test current impulse is intruded. This guarantees that the current rise times when intruding the individual test current impulses are not distorted by an already existing phase current or strand current.

Figure 5:
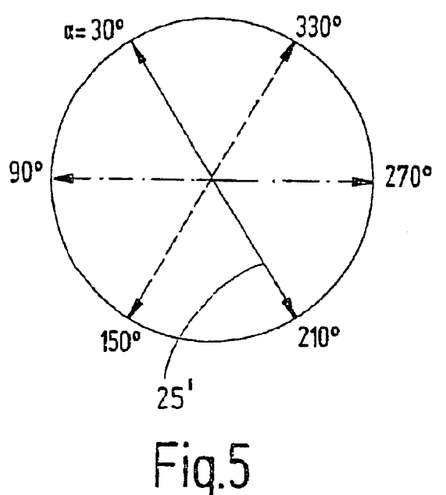
Figure 6:
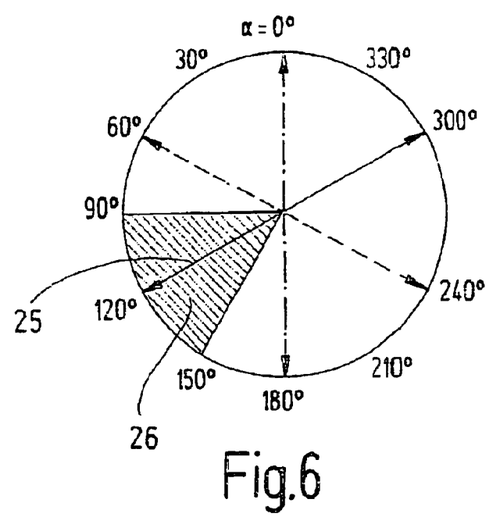

So that the rotor 13 delivers torque after the determination of the position has been ended, a current impulse is now intruded on the stator winding 12, which generates a torque-forming stator flow vector, whose phase position is offset by 90° electrically in the rotor's direction of rotation that has been selected as the direction of force vis-à-vis the determined rotor position. The stator flow vectors 25' for the generating the torque are depicted in FIG. 5. If, for example, the sector 26 of the rotor position is stipulated by the phase position α=120° of the stator flow vector 25 produced by a test current impulse (FIG. 6), then the torque-forming stator flow vector 25' has the phase position α=210°. After a time has lapsed, which is fixed or, e.g., selected as function of the speed of rotation of the motor, the rotor position is checked by intruding additional test current impulses on the stator winding 12, i.e., rechecked to see, on the basis of the intruded current impulse for torque formation, whether the rotor 13 has retained its previously determined position or has changed in order to maintain the driving torque.

Figure 7:
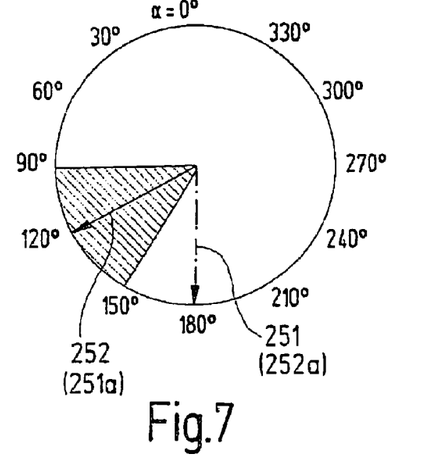
Figure 8:
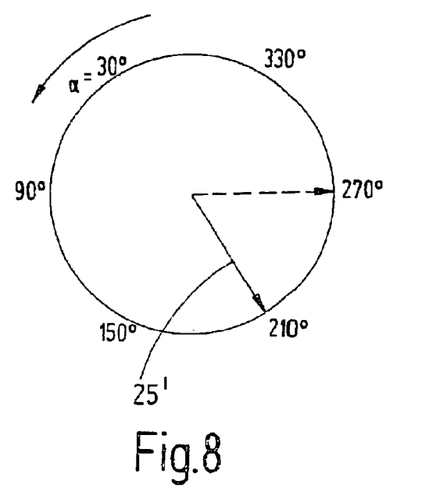

If the motor's direction of rotation is known, additional test current impulses are intruded, as depicted in FIGS. 7 and 8, so that a first additional test current impulse generates a first stator flow vector 251, whose phase position α is offset by half an electrical angular increment, in the exemplary embodiment of the three-phase stator winding 12 by 30° electrically, vis-à-vis the phase position α=210° of the torque-forming stator flow vector 25' (FIG. 8) against the direction of force, which coincides with the direction of rotation.

In doing so, the current rise time is measured as described at the outset. Subsequently, a second additional test current impulse is intruded on the stator winding 12 generating a second stator flow vector 252, whose phase position α is offset by an electrical angular increment, in the exemplary embodiment 60° electrically vis-à-vis the first stator flow vector 251 against the direction of force. The current rise time associated with this stator flow vector 252 is also measured. The two current rise times are now compared to one another and the phase position α of the stator flow vector 251 or 252 with the smallest current rise time is determined as the new rotor position. To do this, the phase positions a of the stator flow vectors 251, 252 generated by the test current impulses and the associated rise times t are, as previously described, again written to memory 21, 22 and compared to one another by the comparison logic 23. The phase position α of the stator flow vector with the smallest current rise time is transmitted to the control device 15. Now, as described previously, a current impulse is intruded on the stator winding 12, which generates a torque-forming stator flow vector 25', whose phase position is offset by 90° electrically vis-à-vis the new rotor position in the direction of force (FIG. 8). The process of intruding the two additional test current impulses and the current impulses to generate torque is continued until the control device 15 recognizes a sufficient speed of rotation of the rotor. Then the control device 15 switches to the, e.g., electromotive force-based, sensorless rotor position determination.

Figure 9:
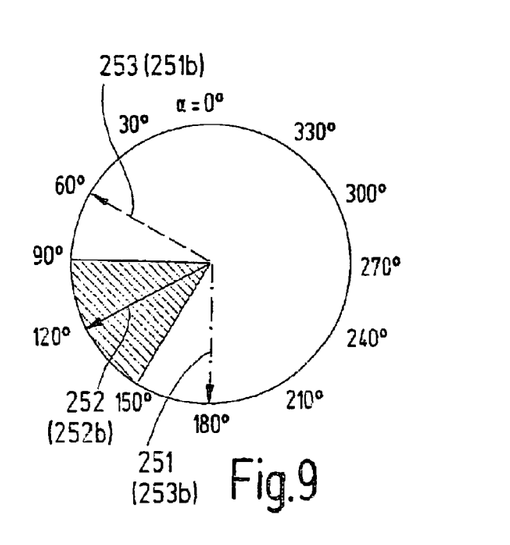
Figure 10:
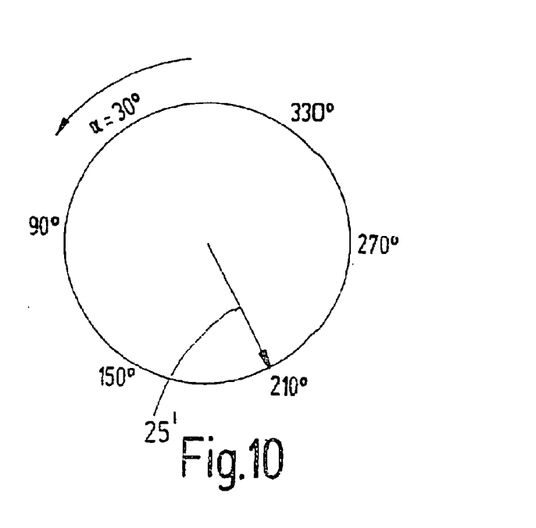

One can start with a known direction of rotation if the possible load moment is not greater than the available motor torque, i.e., the motor does not absolutely have to be rotating when the torque-forming current impulses are intruded, however, it cannot also be moved by the load against the desired direction of rotation. If the direction of rotation is unknown, then, as depicted in FIGS. 9 and 10, in addition to the two additional test current impulses, a third additional test current impulse is still intruded on the stator winding 12, which generates a stator flow vector, whose phase position α is offset by an electrical angular increment, i.e., in the exemplary embodiment by 60° electrically, vis-à-vis the stator flow vector 252 generated by the second test current impulse against direction of force. In this case as well, the current rise time is measured, and the phase position α of the stator flow vector with the smallest current rise time determines the new rotor position. For the subsequent generation of torque, a current impulse is applied in the same way to the stator winding 12, which generates a torque-forming stator flow vector 25' with a phase position leading vis-à-vis the newly determined rotor position by 90° electrically in the direction of force (FIG. 10).

While it is necessary for the phase currents to have completely decayed in the winding phases 121–123 before each test current impulse is applied, the current impulse to generate a torque-forming stator flow vector can directly follow the last test current impulse. Decaying of the phase current or the strand current is not required in this case. In order to improve the relation of time for the test current impulses and time for the current impulse for generating the torque without lengthening the time for generating the torque, the following modified procedure is followed when intruding the additional test current impulses as described above in order to recheck rotor position and increase the driving torque for the rotor 13:

In the case that the rotor's direction of rotation is known (FIGS. 7 and 8), the additional test current impulses are intruded in such a way that a first additional generates a first stator flow vector 251a, whose phase position α coincides with the rotor position, as determined by applying the first six test current impulses. Subsequently, a second additional test current impulse is intruded on the stator winding 12, which generates a second stator flow vector 252a, whose phase position is offset by an electrical angular increment, i.e., 60° electrically, in the direction of force, which again coincides with the direction of rotation, vis-à-vis the first stator flow vector 251a. The reference numbers for these two stator flow vectors are indicated in parentheses in FIG. 7. The current rise times of both test current impulses are measured and the phase position of the stator flow vector with the associated smallest current rise time is determined as the new rotor position. Subsequently, a current impulse is again intruded on the stator winding 12 to generate torque. The torque-forming stator flow vector 25' (FIG. 8) generated by this current impulse is shifted by 90° electrically vis-à-vis the newly determined rotor position in the direction of force. If the newly determined rotor position does not coincide with the previously determined rotor position, then the example assumed in FIGS. 7 and 8 is 120° electrically, and therefore the stator flow vector 252a generated by the last applied test current impulse lies by half an electrical angular increment from here 30° electrically next to the torque-forming stator flow vector 25' so that to generate the current impulse for the torque-forming stator flow vector with the phase position α=210°, only the winding phase 122 no longer needs to be energized, as can be seen from the energizing scheme shown on the right side of the table in FIG. 3. If, on the other hand, the newly determined rotor position deviates from the previously determined rotor position, then in the example shown in FIG. 7 the phase position is a =180° electrically, and therefore the stator flow vector 25 generated with the most recently applied test current impulse lies 90° electrically next to the stator flow vector 25' required for torque formation (shown as a broken line in FIG. 8) and a winding phase can remain equally energized for applying the torque-forming stator flow vector 25' leading by 90° in the phase position. In the example presented in FIGS. 7 and 8 with a phase position α=270° of the stator flow vector 25', this is winding phase 123 of the stator winding 12, which was energized by the last test current impulse together with the winding phases 121 and 122. In both cases, the last test current impulse is therefore integrated with the current impulse for generating the torque-forming stator flow vector, whereby a clear increase in torque is achieved in start-up.

Figure 3:
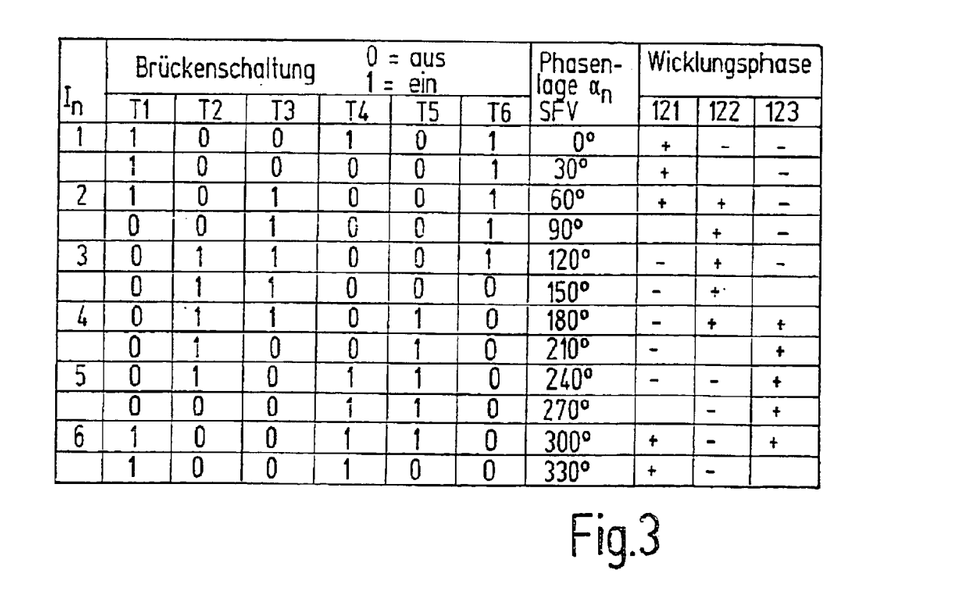
FIG. 3 A commutation pattern stored in the control device of the device according to FIG. 1.

If the motor's direction of rotation is unknown, on the other hand, to achieve the same advantages as described above, the total of three additional test current impulses are intruded on the stator winding 12 in such a way that, as depicted in FIG. 9, a first additional test current 251b generates a first stator flow vector 251b, which is offset vis-à-vis the phase position of the torque-forming stator flow vector 25' by 90° electrically plus half an electrical angular increment, i.e., 30° electrically, against the direction of force. The associated current rise times are measured and saved. In the example assumed in FIGS. 9 and 10, this stator flow vector 251b has a phase position α=60°, and is therefore offset vis-à-vis the torque-forming stator flow vector 25' by 150° electrically against the direction of force. Afterwards, a second additional test current impulse is intruded, which generates a stator flow vector 252b, which is offset vis-à-vis the first stator flow vector 251b by an electrical angular increment, i.e., 60° electrically, in the direction of force. In this case as well, the associated current rise time is measured. A third additional test current impulse is intruded, which generates a third stator flow vector 253b, whose phase position is again offset by an electrical angular increment, i.e., 60° electrically, vis-à-vis the second stator flow vector 252b. The associated current rise time is again measured. Which of the three stator flow vectors 251b, 252b, 253b whose current rise time is the smallest is now determined. The phase position α of this stator flow vector is defined as the new rotor position. In this case as well, the stator flow vector 213b, which was generated by the last test current impulse intruded on the stator winding 12, lies 30° electrically next to the stator flow vector 25' required for torque formation, if the same rotor position as before was recognized, and 90° electrically next to the stator flow vector 25', which was required for the subsequent generation of torque, if the rotor position has changed. As already emphasized above, in the first case (same rotor position), only one phase no longer needs to be energized for the generation of torque. In the second case of the changed rotor position, a stator flow vector must be generated, which leads the newly determined rotor position by 90° electrically in the direction of force. As the energizing pattern of the winding phases in the right part of the table in FIG. 3 shows, to do this, the same winding phase, which was also energized by the last intruded test current impulse, can remain energized. The comparison of the current rise times of the three test current impulses takes place again in this case by the comparison logic 23, and the phase position α of the last stator flow vector written to the second memory 22, which determines sector 26 in which the rotor 13 is located, is fed to the control device 15. Also in this case, the three test current impulses and the current impulse to generate torque are applied repeatedly after a certain time has lapsed and the same procedure is carried out so long until the control device 15 recognizes that the rotor's 13 speed of rotation is sufficient.

What is claimed is:

1. Process to start a brushless direct current motor with a rotor (13) that is excited by a permanent magnet or direct current and a stator (11) bearing a multiphase stator winding (12) as well as with a switching device (14) controlled by a control device (15) for the logical connection of the winding phases (121, 122, 123) of the stator winding (12) to a mains direct current, in which, during rotor standstill, a plurality of current impulses is intruded on the stator winding (12) by corresponding control of the switching device (14), the current rise time until a current threshold is reached is measured in the stator winding (12) with every current impulse and the rotor position is derived from the measured current rise times, characterized in that a plurality of test current impulses is successively intruded on the stator winding (12) in such a way that the test current impulses generate stator flow vectors (25) offset by the same angular increments over 360° electrically, and that the current rise time for each stator flow vector (25) is measured in the total current of the stator winding (12) and the phase position (α) of the stator flow vector with the smallest current rise time is determined as the rotor position.

2. Process according to claim 1, characterized in that the time span between the consecutive test current impulses is selected in such a way that phase currents generated by the a test current impulse have decayed in the stator winding (12) before the next test current impulse is intruded.

3. Process according to claim 1, characterized in that the angular increments with an m-phase stator winding (12) are selected at 180°/m electrically and a total of 2 m test current impulses are intruded on the stator winding (12), whereby m is greater than 2.

4. Process according to one of the claim 1, characterized in that after determining the rotor position a current impulse is intruded on the stator winding (12), which generates a torque-forming stator flow vector (25'), whose phase position is offset by 90° electrically in a rotor direction of rotation selected as the direction of force vis-à-vis the determined rotor position, and that after a time span additional test current impulses to check rotor position and additional test impulses to generate torque are intruded on the stator winding (12).

5. Process according to claim 4, characterized in that the additional test current impulses are intruded in such a way that a first additional test current generates a first stator flow vector (251), whose phase position (α) is offset by half an electrical angular increment vis-à-vis the phase position (α) of the torque-forming stator flow vector (25') against the direction of force, and a second additional test current impulse generates a stator flow vector (252), whose phase position is offset by an electrical angular increment vis-à-vis the first stator flow vector (251) against the direction of force, that the current rise times associated with the two stator flow vectors (251, 252) are measured and compared to one another and the phase position (α) of the stator flow vector with the smallest current rise time is determined as the new rotor position and that another current impulse is intruded on the stator winding (12), which generates a torque-forming stator flow vector (25'), whose phase position is offset by 90° electrically vis-à-vis the new rotor position in the direction of force.

6. Process according to claim 4, characterized in that the additional test current impulses are intruded in such a way that a first additional test current generates a first stator flow vector (251), whose phase position (α) is offset vis-à-vis the phase position (α) of the torque-forming stator flow vector (25') by half an electrical angular increment against the direction of force and a second and third additional test current impulse generate a second and third stator flow vector (252, 253), whose phase positions (α) are each offset vis-à-vis the first stator flow vector (251) or the second stator flow vector (252) by an electrical angular increment against the direction of force, that the current rise times associated with the stator flow vectors (251, 252, 253) are measured and compared to one another and the phase position (α) of the stator flow vector with the smallest current rise time is determined as the new rotor position and that another current impulse is intruded on the stator winding (12), which generates a torque-forming stator flow vector (25'), whose phase position (α) is offset by 90° electrically vis-à-vis the new rotor position in the direction of force.

7. Process according to claim 4, characterized in that the additional test current impulses are intruded in such a way that a first additional test current generates a first stator flow vector (251a), whose phase position (α) coincides with the determined rotor position and a second additional test current impulse generates a second stator flow vector (252a), whose phase position is offset by an electrical angular increment vis-à-vis the first stator flow vector (251a) in the direction of force, that the current rise times associated with the two stator flow vectors (251a, 252a) are measured and compared to one another, and the phase position (α) of the stator flow vector with the smallest current rise time is determined as the new rotor position and that another current impulse is intruded on the stator winding (12), which generates a torque-forming stator flow vector (25'), whose phase position is offset by 90° electrically vis-à-vis the new rotor position in the direction of force.

8. Process according to claim 4, characterized in that the additional test current impulses are intruded in such a way that a first additional test current generates a first stator flow vector (251*b*), which is offset vis-à-vis the phase position of the torque-forming stator flow vector (25') by 90° electrically plus an electrical angular increment against the direction of force, a second additional and third additional test current impulse generate a second and third stator flow vector (252*b*, 253*b*), each of which is offset vis-à-vis the first or second stator flow vector (251*b*, 252*b*) by an electrical angular increment in the direction of force, that the current rise times associated with the stator flow vectors (251*b*, 252*b*, 253*b*) are measured and compared to one another, and the phase position ($\alpha$) of the stator flow vector with the smallest current rise time is determined as the new rotor position and that another current impulse is intruded on the stator winding (12), which generates a torque-forming stator flow vector (25'), whose phase position is offset by 90° electrically vis-à-vis the new rotor position in the direction of force.

9. Process according to one of the claim 5, characterized in that the intrusion of the additional test current impulses and of the additional torque-forming current impulses is repeated so long until a sufficiently great rotor speed of rotation is achieved.

10. Process according to one of the claim 1, characterized in that in order to determine the stator flow vector that determines the rotor position the phase positions ($\alpha_n$) and the associated current rise times ($t_n$) of consecutive stator flow vectors are saved and in the process the saved values of the previous stator flow vector are overwritten by those of the successive stator flow vector, if the current rise time associated with the successive stator flow vector is smaller than the current rise time associated with the previous stator flow vector.

* * * * *